March 8, 1966 J. D. FRY 3,238,640
GRAIN DRYER
Original Filed Aug. 24, 1959 8 Sheets-Sheet 3

Fig. 3

INVENTOR.
Joseph Dale Fry
BY
Atty.

March 8, 1966 J. D. FRY 3,238,640
GRAIN DRYER
Original Filed Aug. 24, 1959 8 Sheets-Sheet 4

Fig. 4

INVENTOR.
Joseph Dale Fry
BY *Gruhlwells*
Atty.

March 8, 1966  J. D. FRY  3,238,640
GRAIN DRYER
Original Filed Aug. 24, 1959  8 Sheets-Sheet 7

INVENTOR.
Joseph Dale Fry
BY
atty.

March 8, 1966 J. D. FRY 3,238,640
GRAIN DRYER
Original Filed Aug. 24, 1959 8 Sheets-Sheet 8

INVENTOR.
Joseph Dale Fry
BY *Fred Wells*
atty.

United States Patent Office 3,238,640
Patented Mar. 8, 1966

3,238,640
GRAIN DRYER
Joseph Dale Fry, Garden City, Kans., assignor, by mesne assignments, to Hart-Carter Company, Chicago, Ill., a corporation of Delaware
Continuation of application Ser. No. 835,463, Aug. 24, 1959. This application Sept. 4, 1962, Ser. No. 222,757
4 Claims. (Cl. 34—167)

This is a continuation of Serial Number 835,643, filed August 24, 1959, now abandoned.

My invention relates to grain dryers. It is the principal purpose of my invention to provide a grain dryer wherein the grain is dried by circulating hot air through it with a novel means at the top of the dryer to distribute the grain and mix the trash, etc., which is present, evenly in the grain and means at the air inlet for heating and mixing the gas and air for drying which is so arranged as to prevent heat radiation from the burners to that portion of the grain columns adjacent to the burner, thereby to avoid the prevalent fire hazards in grain drying.

It is also a purpose of my invention to provide a novel means for controlling the rate of passage of grain through the drying columns in combination with the mixing and distributing means whereby uniformity of drying is accomplished.

It is a further purpose of my invention to provide an improved outlet structure for the outlet of grain from the drying columns which facilitates the cleaning and maintenance of the dryer.

The nature and advantages of my invention will appear more fully from the following description and the accompanying drawings wherein a preferred form of the invention is shown. The drawings and description are intended to be illustrative only and various minor departures from the exact construction shown and described may be made without departing from the scope of the invention as defined in the claims.

Referring now in detail to the drawings and particularly to FIGURES 1 to 3 and 5, the general nature of the dryer will be described.

The dryer is shown as mounted on a trailer frame 1 provided with wheels 2, 3, 4 and 5, and having a front hitch 6 for attachment to a powered vehicle. The trailer frame is made up of longitudinally running channels 7 and 8 and cross bars 9 beneath the channels 7 and 8 and welded thereto. Affixed to each cross bar 9 and extending upwardly therefrom are four posts 10, 11, 12 and 13. The tops of the posts 10 are secured to each other by welding a beam 14 thereto. Similar beams 15, 16 and 17 are welded to the tops of the posts 11, 12 and 13. The posts 10 are connected by braces 18 to the channel 7 and the posts 13 are connected by braces 19 to the channel 8. The beams 15 and 16 are connected to each other at the tops of each pair of posts 11 and 12 by cross bars 20.

Figure 1:
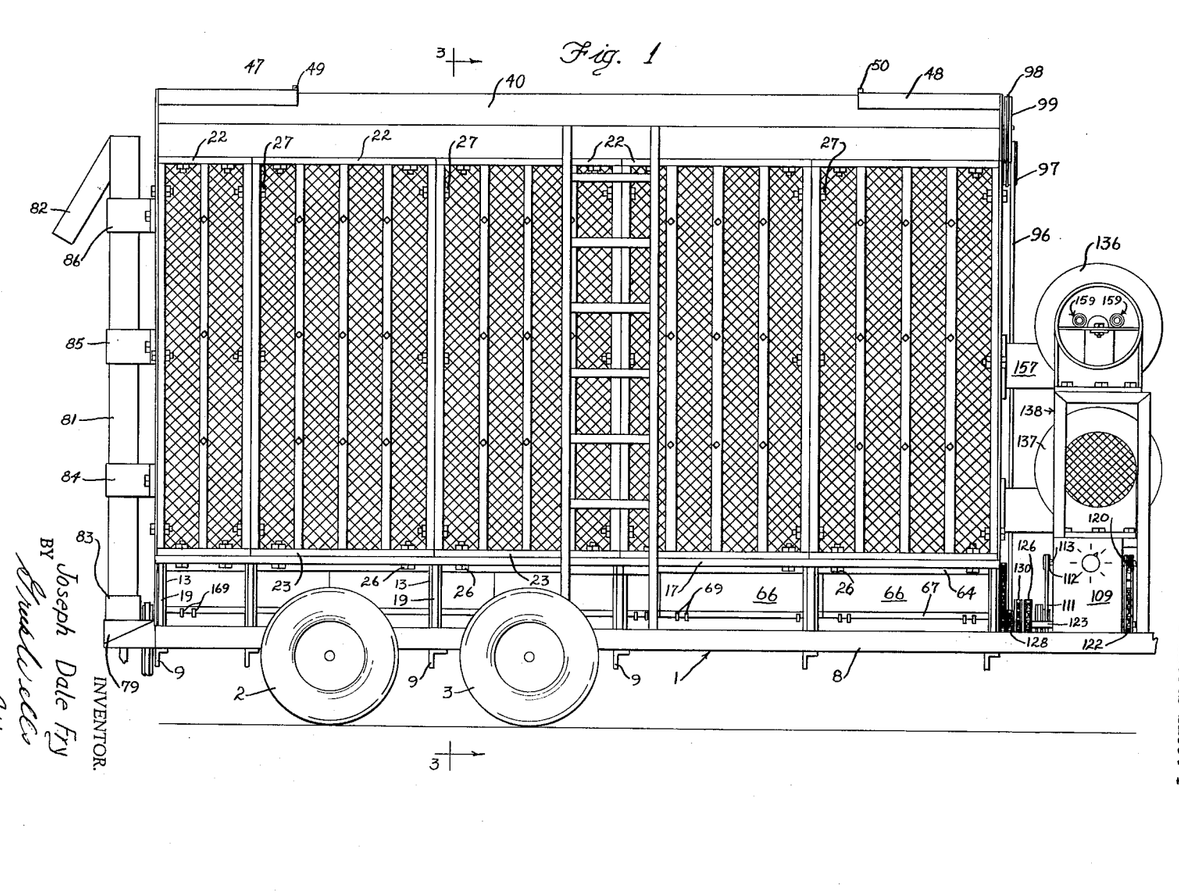
FIGURE 1 is a view in side elevation of a portable grain dryer embodying my invention.
Figure 3:
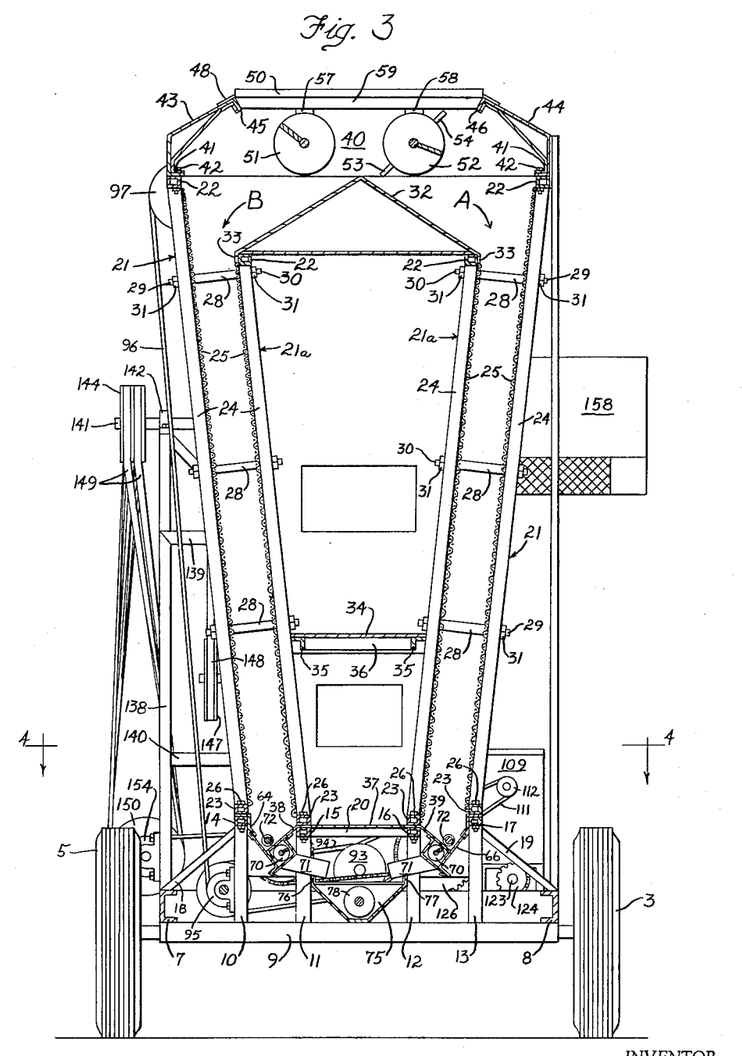
FIGURE 3 is a sectional view taken on the line 3—3 of FIGURE 1.

The four beams 14, 15, 16 and 17 provide mounting means for four rows of screen panels 21 and 21a (FIGURE 3). Each panel 21 and 21a comprises a top bar 22, a bottom bar 23 and a plurality of upright bars 24, each welded to the bars 22 and 23 to make a rectangular panel. One surface of the panel 21 or 21a is covered with wire screen 25. A plurality of the panels 21 or 21a is placed upon each of the beams 14, 15, 16 and 17 and bolted thereto by bolts 26 which are passed through the bars 23 of the panels and the corresponding one of the beams 14–17. The panels 21 in a row are also bolted to each other by bolts 27 (FIGURE 1). The inner panels 21a are somewhat shorter than the panels 21 and they are arranged with the screened surfaces facing outward. The outer panels 21 have their screened surfaces facing inward. Each panel 21 is connected to the adjacent panel 21a by three rows of cross tie rods 28 which have reduced threaded ends 29 and 30 extending through the bars 24 and held by nuts 31. This construction provides the two passages A and B for the downflow of the material to be dried. (See FIGURE 3.)

At the top of the panels 21a a triangular roof 32 is provided (FIGURE 3). It is provided with a flange 33 that overlaps the top bars 22 of the panels 21a and is secured to them. About two-thirds of the way down from the roof 32 a partition 34 is laid across the space between the panels 21a and supported by frame members 35 which are cross braced by braces 36 and which are fastened to the panels 21a. A bottom wall 37 is laid on the cross bars 20 beneath the panels 21a and is turned down outside the beams 15 and 16 as indicated at 38 and 39 to form part of the discharge outlets for the passages A and B, as will be described more fully hereinafter.

Figure 5:
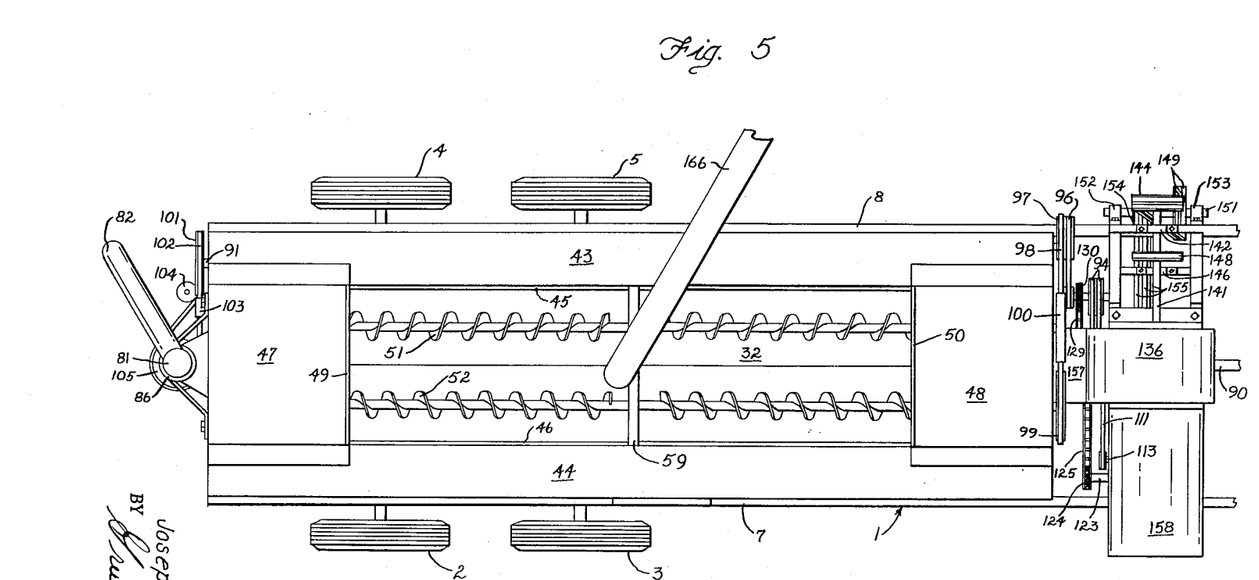
FIGURE 5 is a plan view of the dryer.

The top bars 22 of the panels 21 are bolted to a rectangular shell 40 that is flanged at 41 to rest on the bars 22 and the flange 41 receives bolts 42 that extend through the bars 22. The shell 40 extends upwardly from the flange 41 and has inwardly and upwardly extending walls 43 and 44 extending from end to end of the shell and provided with down turned lips 45 and 46. Cover plates 47 and 48 are overlapped on the walls 43 and 44 at each end of the shell and secured to the walls 43 and 44. The plates 47 and 48 have upturned end flanges 49 and 50 (FIGURE 5).

Figure 11:
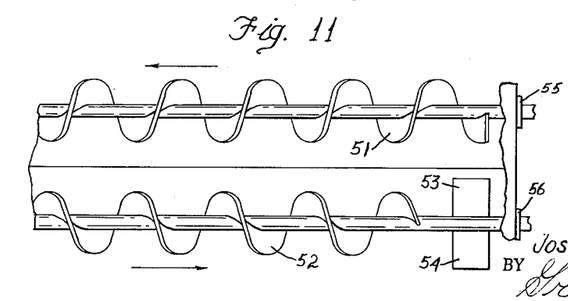
FIGURE 11 is a fragmentary plan sectional view taken substantially on the line 11—11 of FIGURE 2.

Within the shell 40 and overlying the roof 32 I provide a grain distributing mechanism adapted to circulate the grain so as to break up any accumulations of trash or grain and keep the mixture uniform as it flows past the roof 32 into the passages A and B. I have found that some of the big difficulties in dryers where the grain is fed down through a restricted passage can be traced to the bunching of trash, or wet lumps of grain. These lumps or bunches may cause uneven flow and uneven drying. The trash accumulation creates a fire hazard too. The distributing mechanism comprises two exposed augers 51 and 52 (FIGURES 3 and 5). The auger 51 turns in such a direction as to move the grain toward one end of the shell 40 and the auger 52 turns in a direction to move the grain to the other end of the shell. Each auger has flipper blades 53 and 54 at its discharge end (FIGURE 11). These flipper blades toss the grain over to the receiving end of the adjacent auger so that no build up of an excess of grain can occur at either end of the shell. The augers are journalled in suitable bearings 55–56 at the ends of the shell 40 and may also be supported in bearings 57 and 58 carried by a cross bar 59, intermediate the ends of the shell 40 (FIGURE 5). The drive mechanism for the auger shafts 51a and 51b will be described later herein.

Figure 4:
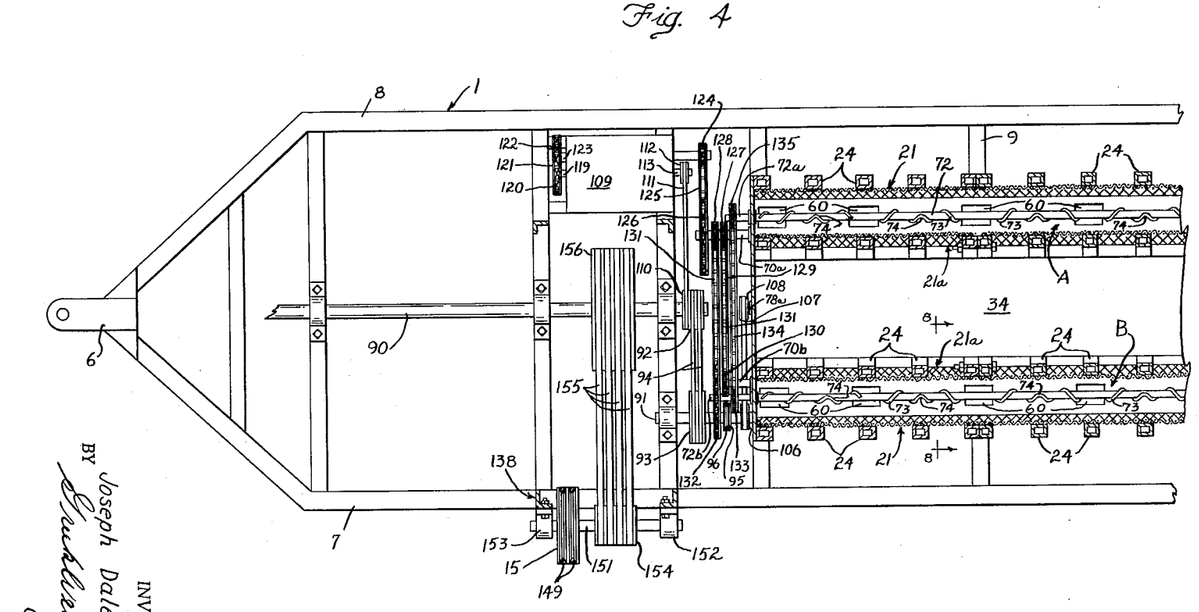
FIGURE 4 is a fragmentary sectional view taken on the line 4—4 of FIGURE 3.
Figures 8, 10:
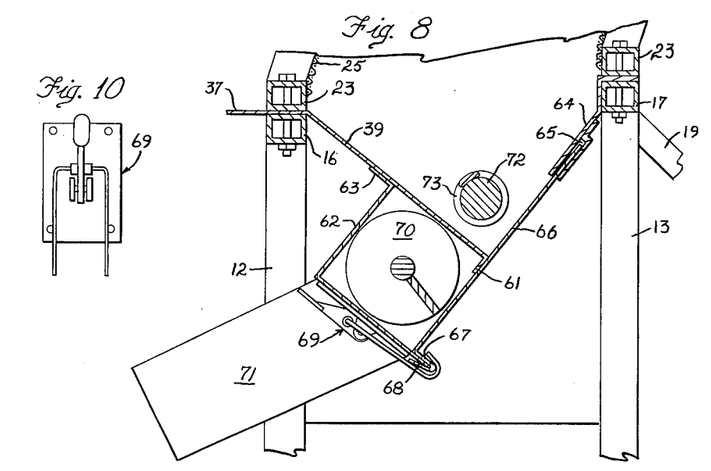
FIGURE 8 is an enlarged fragmentary sectional view taken on the line 8—8 of FIGURE 4.
FIGURE 10 is a plan detail view of the latch used to keep the discharge channels of the dryer closed.

Referring now to the mechanism for controlling the discharge of grain from the passages A and B, it will be appreciated that this mechanism must be such that it can be made to vary the rate of flow of grain through the passages in order to obtain adequate drying of the grain. It must be such as to remove the grain rather evenly throughout the length of each passage, otherwise uneven drying will result. The portions 38 and 39 of the bottom wall 37 form parts of the grain discharge structure. Each of the portions 38 and 39 has a series of rectangular apertures 60 near its lower edge (FIGURE 4). A flange 61 (FIGURE 8) is provided along the lower edge of each of the portions 38 and 39. An L-shaped plate 62, best illustrated in FIGURE 8, is permanently affixed to the under face of each of the portions 38 and 39 by a flange 63. Each of the beams 14 and 17 has mounted thereon a sheet metal plate 64 which is provided with a channel 65 that is open toward flange 61. A closure sheet 66 has one side edge seating in the channel 65 and extends across the flange 61 to the plate 62. At the plate 62 the closure sheet 66 has an out turned flange 67 that is doubled back on itself as indicated at 68 to fit over the free edge of the plate 62. Over center latches 69 are mounted on the L-shaped plate 62, as shown in FIGURES 8 and 10. These latches releasably hold the closure sheet 66 in place.

The plate 62 and the sheet 66 form an auger casing below the apertures 60 in the bottom wall portions 38 and 39, as shown in FIGURE 8. An auger 70 is mounted in the casing. The plate 62 has a series of discharge spouts 71 affixed thereto. These spouts 71 are offset lengthwise of the dryer with respect to the apertures 60 so that the grain must be moved lengthwise of the plate 62 from its entry through the apertures 60 to the auger 70. Therefore the turning rate of the auger 70 determines the rate of discharge of grain from the passages A and B, provided the grain feeds uniformly into the apertures 60.

To insure proper feeding of the grain into the apertures 60, an agitator 72 (FIGURES 4 and 8) is mounted in each passage A and B just above the apertures 60. The agitator 72 is a rod having spaced smaller rods 73 welded thereon. The smaller rods 73, as indicated in FIGURE 4 of the drawings, have their outer points 74 midway between the apertures 60 and they are wound from the points 74 about the agitator rods 72 in the direction opposite to that in which the rods 72 turn. The smaller rods 73 terminate over the apertures 60. The agitator just described keeps the grain moving into the apertures 60 and doesn't allow a build up of grain between the apertures 60 along the bottoms of the passages A and B.

Figure 9:
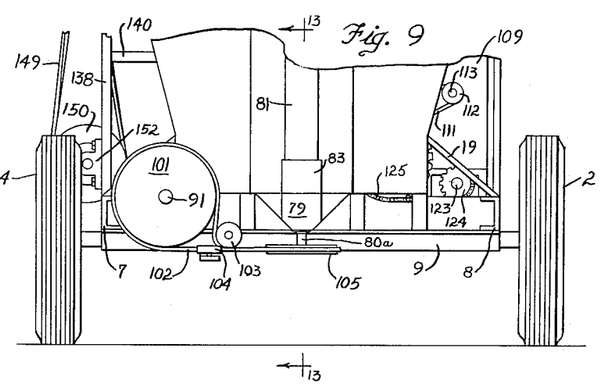
FIGURE 9 is a fragmentary front end view of the dryer.
Figure 13:
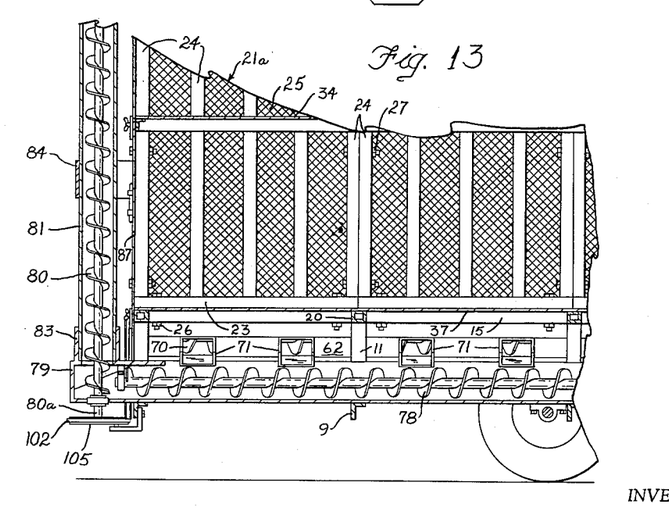
FIGURE 13 is a fragmentary sectional view taken on the line 13—13 of FIGURE 9.

The grain from the spouts 71 falls into a pan 75 (FIGURE 3) which is mounted on the cross bars 9 between the posts 11 and 12 and has its side flanges 76 and 77 secured to these posts. An auger 78 in the bottom of the pan 75 moves the grain endwise of the dryer to one end thereof and into a box 79 (FIGURES 9 and 13) where the grain is picked up by an auger 80 in a casing 81 and elevated to a discharge spout 82. The casing 81 is mounted in a collar 83 on the box 79 and in spaced supports 84, 85 and 86 that are affixed to the end of the dryer (FIGURES 1 and 5). The supports permit the casing 81 to turn as they only grip it frictionally. The spout 82 can be swung around to discharge into a receiving truck or other receiver.

Access to the interior of the dryer is provided for by installing a removable end panel 87 behind the casing 81. This panel is fastened by any suitable means.

The driving means for the augers 51 and 52, the two augers 70, the two agitators 72, the auger 78 and the auger 80 uses a power take-off shaft 90. This shaft is connected as shown in FIGURE 4 to a belt shaft 91 by pulleys 92 and 93 and belts 94. The shaft 91 has a pulley 95 thereon which drives a belt 96 (see FIGURES 2 and 3) that in turn drives a pulley 97 at the top of the dryer. The pulley 97 is a double pulley and drives a belt 98 that drives two pulleys 99 and 100 on the auger shafts 51a and 52a so that the two shafts rotate in opposite directions.

The shaft 91 extends to the discharge spout end of the dryer where it has a pulley 101 thereon (see FIGURE 9) which is connected by a belt 102 running through belt guides 103 and 104 to a pulley 105 that is on the shaft 80a of the auger 80.

The auger 78 is driven from the shaft 91 by a pulley 106 (see FIGURE 4), a belt 107 and a pulley 108 fixed to the shaft 78a of the auger 78.

The two augers 70 and the two agitators 72 must be controlled in speed.

Figure 12:
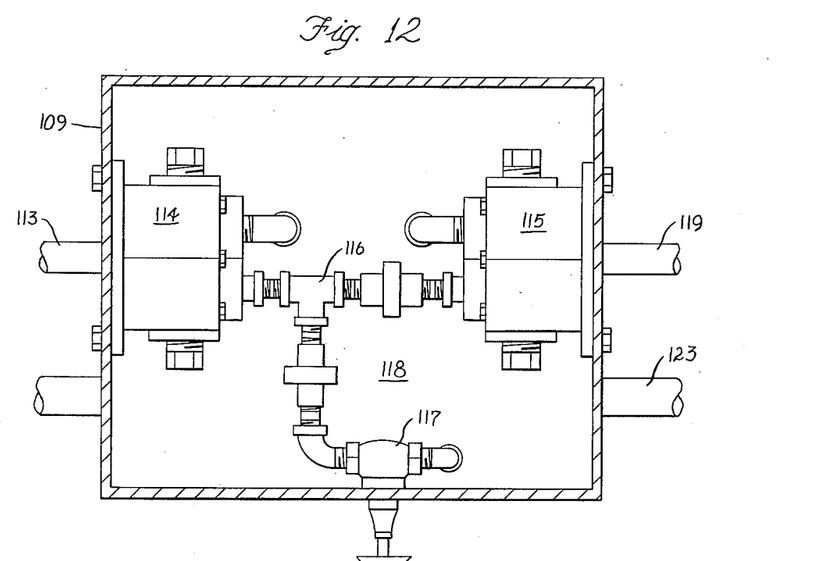
FIGURE 12 is a plan view of the hydraulic pump and motor drive mechanism for controlling flow of grain through the dryer.

The driving mechanism for these augers and agitators, as shown in FIGURE 4, embodies a hydraulic pump and motor unit 109 which is powered by a pulley 110 on the shaft 90 which drives a belt 111 that in turn drives a pulley 112 on a shaft 113 of the pump and motor unit 109 (FIGURE 12). The unit 109 comprises a pump 114, a hydraulic motor 115, a fluid conduit 116 from the pump 114 to the motor 115 and a valve 117 connected to the conduit 116 operable to by-pass a variable amount of fluid from the pump 114 to its reservoir 118 and thereby control the speed of the hydraulic motor 115.

The motor 115 has its shaft 119 connected by a sprocket wheel 120, a chain 121 and a larger sprocket wheel 122 to a main shaft 123 that in turn drives the augers 70 and the agitators 72 (FIGURE 4). The shaft 123 extends under the unit 109 and carries a sprocket wheel 124 which drives a chain 125 that in turn drives a large sprocket wheel 126 that is fixed on the shaft 70a of one of the augers 70. The shaft 70a has fixed thereon two other sprocket wheels 127 and 128. The sprocket wheel 127 drives a chain 129 that in turn drives a sprocket wheel 130 of the same size as the sprocket wheel 127. The sprocket wheel 130 is fixed on the shaft 70b of the other auger 70 so the augers 70 will rotate at the same speed.

The sprocket wheel 128 drives a chain 131 that in turn drives a large sprocket wheel 132 that is fixed on the shaft 72b of the agitator 72 that is in the passage B. The shaft 72b carries a second smaller sprocket wheel 133 which drives a chain 134 that in turn drives a sprocket wheel 135 which is fixed on the shaft 72a of the agitator 72 that is in the passage A. The sprocket wheels 133 and 135 are the same size so the two agitators 72 turn at the same speed.

It is believed to be evident that by using the valve 117 to vary the speed of the hydraulic motor 115, the operator may, for any given speed of the power take-off shaft 90, vary the speed of the augers 70 and agitators 72 so as to keep the grain moving in the passages A and B at the proper rate for adequate drying with the drying medium available. The means to supply the drying medium will now be described.

Figure 6:
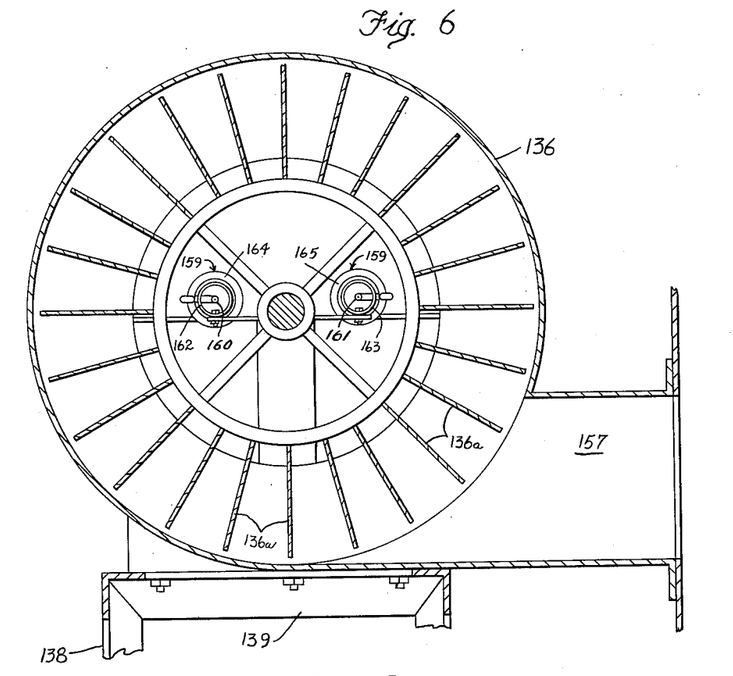
FIGURE 6 is an enlarged fragmentary sectional view taken on the line 6—6 of FIGURE 2.

The drying medium is supplied by two blowers 136 and 137. These blowers are mounted on a framework 138 at one end of the dryer (FIGURE 6). The framework 138 has two platforms 139 and 140 on which the blowers 136 and 137 respectively are mounted. The blower 136 has an extended shaft 141 that has a bearing provided for it at 142 on the platform 139. A single pulley 143 and a double pulley 144 are fixed on the shaft 141. The blower 137 has an extended shaft 145 which is supported in a bearing 146 that is provided on the platform 140. The shaft 145 has a pulley 147 fixed thereon which is driven from the pulley 143 on the shaft 141 by a belt 148.

Figure 2:
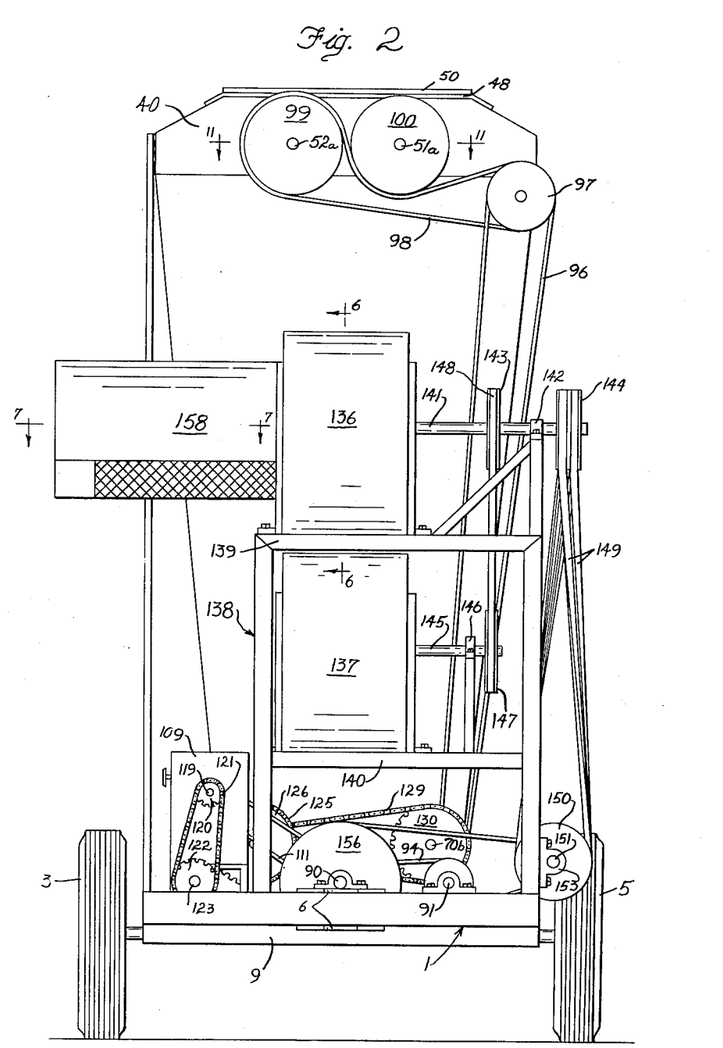
FIGURE 2 is a rear end view of the dryer.

The double pulley 144 is driven by two belts 149 from a double pulley 150 that is fixed on a pulley shaft 151 (FIGURE 2). The shaft 151 is supported in bearings 152 and 153 that are provided on the framework 138. Pulleys 154, fixed on the shaft 151, are driven by belts 155 which in turn are driven by pulleys 156 fixed on the power shaft 90.

Figure 7:
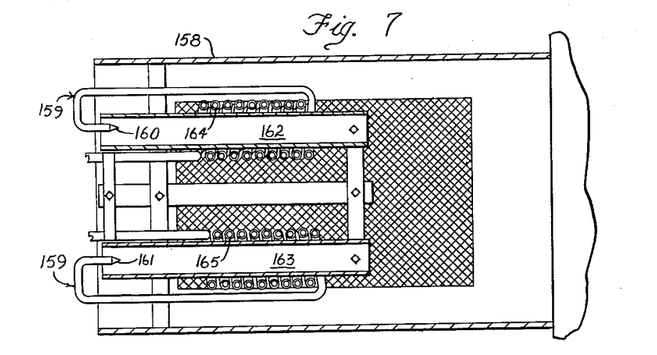
FIGURE 7 is an enlarged fragmentary sectional view taken on the line 7—7 of FIGURE 2.

The upper blower 136 is adapted to supply heated air to that portion of the space within the dryer between the partition 34 and the roof 32 and between the panels 21a. This is the hot air space and by blowing hot air into this space it will in turn be forced out through the grain in the passages A and B and above these passages. Note from FIGURE 1 that the blower 136 is spaced from the end of the dryer and connected thereto by an air duct 157. This upper blower has an inlet throat 158 (see FIGURES 2, 6 and 7) in which heaters 159 are mounted. These heaters have gas burners 160 and 161 that are arranged to heat the tubes 162 and 163 and the vaporizing coils 164 and 165 around them so as to supply heat to air being drawn into the blower 136. The air and the gases of combustion must go through the blower blades 136a, then through the duct 157 before it can enter the hot air space or chamber of the dryer. This arrangement practically avoids one major danger in grain drying, i.e., the introduction of flames into the hot air chamber of the dryer. It also insures thorough mixing of the products of combustion from burners 160 and 161 with the air being drawn into blower 136. That part of the space between the panels 21a beneath the partition 34 is the cold air chamber. The blower 137 forces cold air into this chamber, which in return must pass through the passages A and B to escape. In doing so, it reduces the temperature of the dried grain and actually continues to remove moisture because, as it is heated by the hot grain, it demands more moisture until the grain reaches the "dew point." After that moisture is added by further cooling of the grain.

The grain is usually fed into the dryer either by means of a spout 166 (FIGURE 5) from an overhead bin or from an auger carrying grain from the ground to the top of the machine. In either case the material must be spread uniformly across the top of the machine to keep ahead of grain to all parts of the dryer passages A and B at all times. The two augers 51 and 52 continually turning in opposite directions, with their flipper blades 53 and 54, circulate the grain around the top of the machine within the shell 40. This action keeps the passages A and B equally filled. It also thoroughly mixes the trash with the grain and breaks up any lumps of grain that are encountered and mingles the more dry with the less dry grain at the top of the machine before the heating takes place to any appreciable extent.

I have found that where grain enters the dryer from natural flow, the trash (chaff, straw, etc.) accumulates at the top of the dryer and often enters one of the passages A or B in one concentrated area. Rapid drying of this area takes places and often spontaneous firing takes place. With a large supply of air available a serious fire is almost sure to result. The present method of circulating the incoming grain above the drying passages mixes the existing trash with grain and avoids this difficulty.

The passages A and B are thin enough to allow substantial passage of air. The screen wire column construction allows a maximum of air passage, yet provides adequate support and allows ready replacement of an injured screen panel 21. As the grain flows down in the passages A and B past the hot air chamber, it is gradually dried, becoming more saturated with heat as the moisture content decreases. This protects the grain from heat damage as it can stand more heat when it has lower moisture content.

After the grain has progressed past the hot air chamber, the air from the cold air chamber starts the cooling process. As constructed, the dryer permits control of the cooling. On humid days excessive cooling will result sooner. It is controlled by partially covering the intake to the cool air blower 137. As pointed out before, the drying does continue into the cool air circulating area. With this arrangement and the control of flow of the grain through the passages A and B, I have obtained exceptional efficiency and capacity in a portable dryer.

The control of speed of passage of the grain through the columns A and B is easily accomplished by the unit 109 and the combination of the agitators 72 with the discharge apertures 60, the augers 70 and the discharge spouts 71. The grain is trapped in passing through the apertures 60 and the augers 70 to the spouts 71 so that its rate of removal from the passages A and B is directly responsive to the rate of turning the augers 70 and the agitator rods 72. Their speed is governed by the adjustment of the valve 117. Whenever it is desirable to open the discharge area, it is only necessary to release the closure sheets 66 and the augers 70, the agitators 72, the apertures 60 and the upper ends of the spouts 71 are exposed.

The dryer is fully portable. The wheels are so positioned that just enough weight is placed on the hitch 6 for proper trailing. Where the grain is piled in long piles or ricks on the ground the farmer can move the dryer along the rick without emptying it on every move.

It is believed that the nature and advantages of my invention will be apparent from the foregoing description.

Having thus described my invention, I claim:

1. In a dryer for grains and the like, a supporting frame, two outer upright screen walls supported on the frame, two inner spaced apart upright screen walls on the frame, one of which is adjacent to but spaced from one of said outer walls and the other of which is adjacent to but spaced from the other outer wall to thereby form down-flow passages for the material, a roof covering the space between said inner walls, a floor beneath said space, upright end walls across the ends of said screen walls closing the ends of said space and the passages between the inner and outer walls, means above and supported on said end walls for distributing the material to said passages, an agitator in the bottom of each passage, an auger casing located at the lower end of each passage comprising a sloping floor portion mounted on said frame between said end walls and extending downwardly and outwardly in a transverse direction from the lower end of the adjacent inner screen wall, a depending plate fixed along its upper edge to the lower surface of said floor portion, a removable sheet adapted to enclose the passages between the lower edge of said floor portion and the lower edge of the associated outer screen wall and between the lower edge of said floor portion and the lower edge of said plate, and means adapted to removably secure said sheet on the supporting frame relative to said plate to thereby complete the auger casing, said floor portion having a row of apertures formed therein adjacent its lower edge spaced apart lengthwise of the passage and being in communication with the interior of said auger casing, said plate having a row of spaced outlets formed therein adjacent its lower edge in communication with the interior of said auger casing and being offset lengthwise of the passage from said apertures, said agitator having means thereon operable to move the material along said floor portion from the spaces between the apertures to the apertures, an auger rotatably mounted by said end walls within the interior of said auger casing, variable speed drive means on said frame drivingly connected to said auger, and means on said frame adapted to blow heated air into the space below the roof whereby the air is forced through the material in the passages.

2. In a dryer for grains and the like, a supporting frame, two outer upright screen walls supported on the frame, two inner spaced apart upright screen walls on the frame, one of which is adjacent to but spaced from one of said outer walls and the other of which is adjacent to but spaced from the other outer wall to thereby form down-flow passages for the material, a roof covering the space between said inner walls, a floor beneath said space, upright end walls across the ends of said screen walls closing the ends of said space and the passages between the inner and outer walls, means above and supported on said end walls for distributing the material to said passages, an agitator in the bottom of each passage, an auger casing located at the lower end of each passage, said casings each having a rectangular cross sectional configuration and comprising a sloping floor portion mounted on said frame between said end walls and extending downwardly and outwardly in a transverse direction from the lower end of the adjacent inner screen wall, an L-shaped bent plate fixed along its upper edge to the lower surface of said floor portion and having a section thereof located below and parallel to said floor portion, a removable sheet adapted to enclose the passages between the lower edge of said floor portion and the lower edge of the associated outer screen wall and between the lower edge of said floor portion and the lower edge of said plate, and means adapted to removably secure said sheet on the supporting frame relative to said plate to thereby complete the auger casing, said floor portion having a row of apertures formed therein adjacent its lower edge spaced apart lengthwise of the passage and being in communication with the interior of said auger casing, said plate having a row of spaced outlets formed therein adjacent its lower edge in communication with the interior of said auger casing and being offset lengthwise of the passage from said apertures, said agitator having means thereon operable to move the material along said floor portion from the spaces between the apertures to the apertures, an auger rotatably mounted by said end walls within the interior of said auger casing, variable speed drive means on said frame drivingly connected to said auger, and means on said frame adapted to blow heated air into the space below the roof whereby the air is forced through the material in the passages.

3. The invention as defined in claim 2 further comprising a longitudinal pan mounted on said frame below said floor, said outlets being extended to said pan so as to deliver material to the pan from the auger casing, and an auger rotatably mounted between said end walls within said pan operable to move material in the pan to one end of the dryer.

4. The invention defined in claim 2 wherein the agitator comprises a rod extending lengthwise of the passage and having oppositely directed helical ribs thereon meeting midway between said apertures.

References Cited by the Examiner
UNITED STATES PATENTS

| | | | |
|---|---|---|---|
| 1,219,816 | 3/1917 | French | 34—65 |
| 1,457,325 | 6/1923 | Thatcher | 259—97 |
| 2,594,687 | 4/1952 | Scott | 222—238 |
| 2,657,831 | 11/1953 | Pierce | 222—272 |
| 2,717,104 | 9/1955 | Hoppes | 222—272 X |
| 2,732,630 | 1/1956 | Markowich | 34—174 |
| 2,740,204 | 4/1956 | Seltzer et al. | 34—174 |
| 2,799,097 | 7/1957 | Williams et al. | 34—174 X |
| 2,881,956 | 4/1959 | Bjerre | 222—238 X |
| 3,000,110 | 9/1961 | Forth et al. | 34—174 X |

WILLIAM F. O'DEA, *Primary Examiner.*

NORMAN YUDKOFF, *Examiner.*